J. H. Taplin
Horse Power.
No 6,525.  Patented June 12, 1849.
Fig. 1.
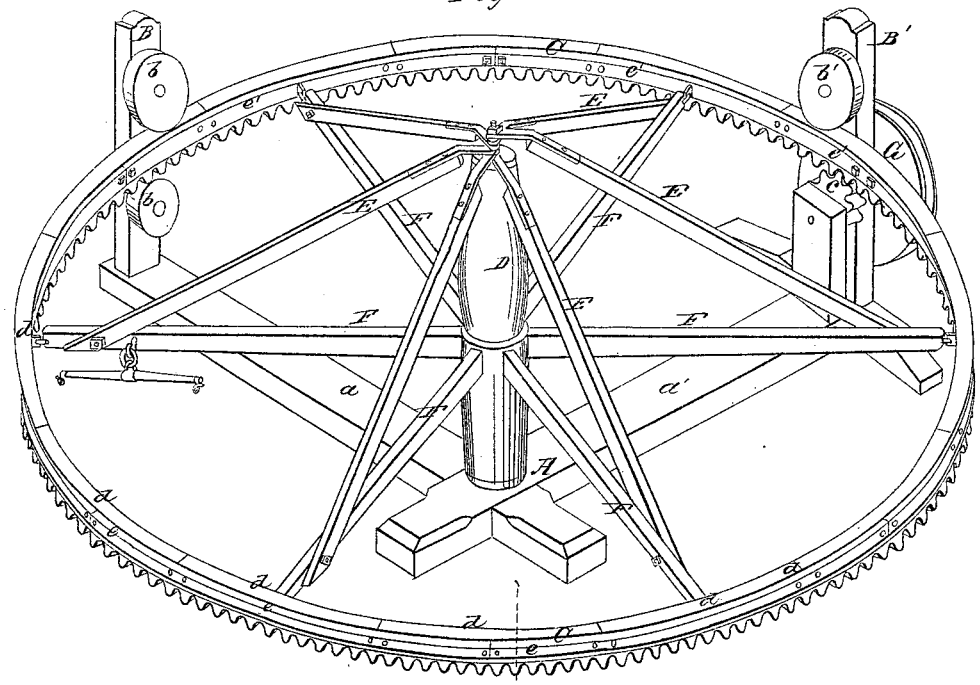
Fig. 3.
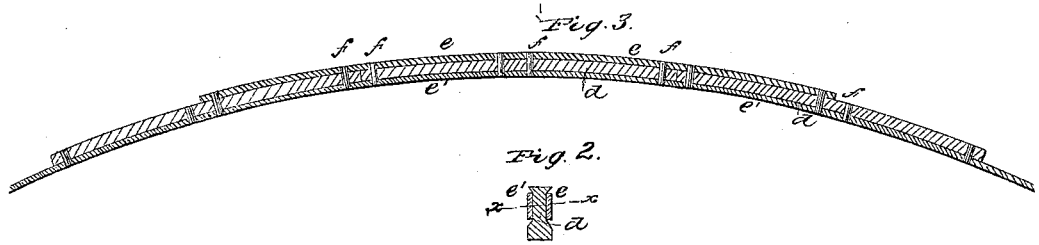
Fig. 2.

UNITED STATES PATENT OFFICE.

JOHN A. TAPLIN, OF FISHKILL, NEW YORK.

CONSTRUCTION OF THE MASTER-WHEEL OF HORSE-POWERS.

Specification of Letters Patent No. 6,525, dated June 12, 1849.

*To all whom it may concern:*

Be it known that I, JOHN A. TAPLIN, of Fishkill, in the county of Dutchess and State of New York, have invented a new and useful Improvement in Portable Horse-Powers, of which the following is a full, clear, and exact description, reference being had to the accompanying drawing, forming part of this specification, in which—

Figure 1 is a perspective view of my improved horse power, Fig. 2 a cross section of the master wheel at the line 1, 1, of Fig. 1; and Fig. 3 a horizontal section of a portion of the master wheel at the line $x\ x$ of Fig. 2.

The nature of my invention consists in giving the segments of the master wheel an I cross section, the segments having greater depth than width, and having vertical cog teeth cast to their lower edges; and in connecting together the segments thus formed by two segmental rings of wrought iron, which are inserted in the opposite depressed sides of the cog segments. The segmental rings break joint with each other, and with the joints of the cog segments, and are secured to each other, and to the cog segments by screw bolts passing transversely through the rim. The several parts when combined, forming a rigid annular wheel which will maintain its shape without the use of framing. In the drawing A is the frame which supports the master wheel. It is composed of two timbers $a\ a'$ crossing each other at right angles. One extremity of each timber extends beyond the circumference of the master wheel, and in these extremities are framed the standards B B'. The master wheel is composed of a self sustaining rim C, Fig. 1, and Figs. 2 and 3, suspended from a central axis D by the rods E, and held at an equal distance from it by the radial arms F. The axis of the wheel is supported in a vertical position, by passing the rim between friction wheels $b, b,$ attached to the standard B and between a friction wheel $b'$ and pinion $c$ secured to the standard B'. The pinion is mounted on the shaft of the belt pulley G by which the power is transmitted to the thrasher or other machine to be driven. The self sustaining rim C is formed of cast segments $d\ d\ d$, having an I section as represented in Fig. 2, the cog teeth being cast on the lower edges of the segments. The segments are united by two segmental ring bands of wrought iron $e'\ e'$, the former within, the latter on the outside of the wheel. These segmental ring bands are received in the depressions in the sides of the toothed segments, and break joint with each other, and with the cast toothed segments as shown in Fig. 3. Holes $f\ f$ are drilled transversely through the segmental rings, through which bolts are passed by which the three sets are firmly bound together. The side depressions in the toothed segments are flaring, so that if the edges of the wrought bands are not exactly parallel, which is sometimes the case in rolled iron, the flaring edges of the depression in the toothed segments will allow the entrance of the band. The bands being firmly clamped between the flanges of the toothed segments render the rim extremely rigid; the flanges also strengthen the segments, and in case of fracture prevent any portion from falling out.

I do not claim making a cog wheel of segments, as this has heretofore been done in various machines; but What I do claim as my invention and desire to secure by Letters Patent is—

Making the rim of the master wheel of a horse power within which the horse walks, of annular segments $(d)$ of cast iron (the cogs being vertical and on the edge of the segment) the inner and outer peripheries of which are grooved, and have segmental bands of wrought iron $(e, e',)$ fitted therein; the wrought iron segments breaking joint with each other and with the cogged segments, and the whole being bound together by through bolts; thus making a portable rim wheel sufficiently strong and rigid to maintain its form, and perform its duty without the assistance of framing.

JOHN A. TAPLIN.

Witnesses:
P. H. WATSON,
E. S. RENWAKE.